United States Patent Office 3,701,602
Patented Oct. 31, 1972

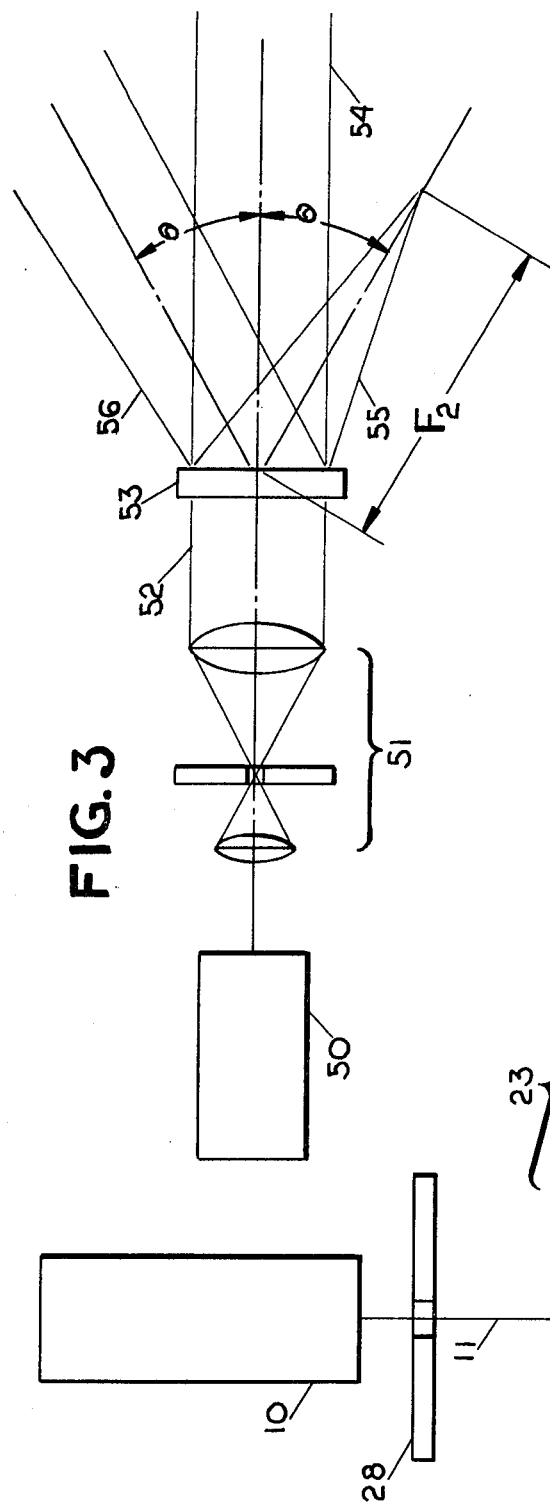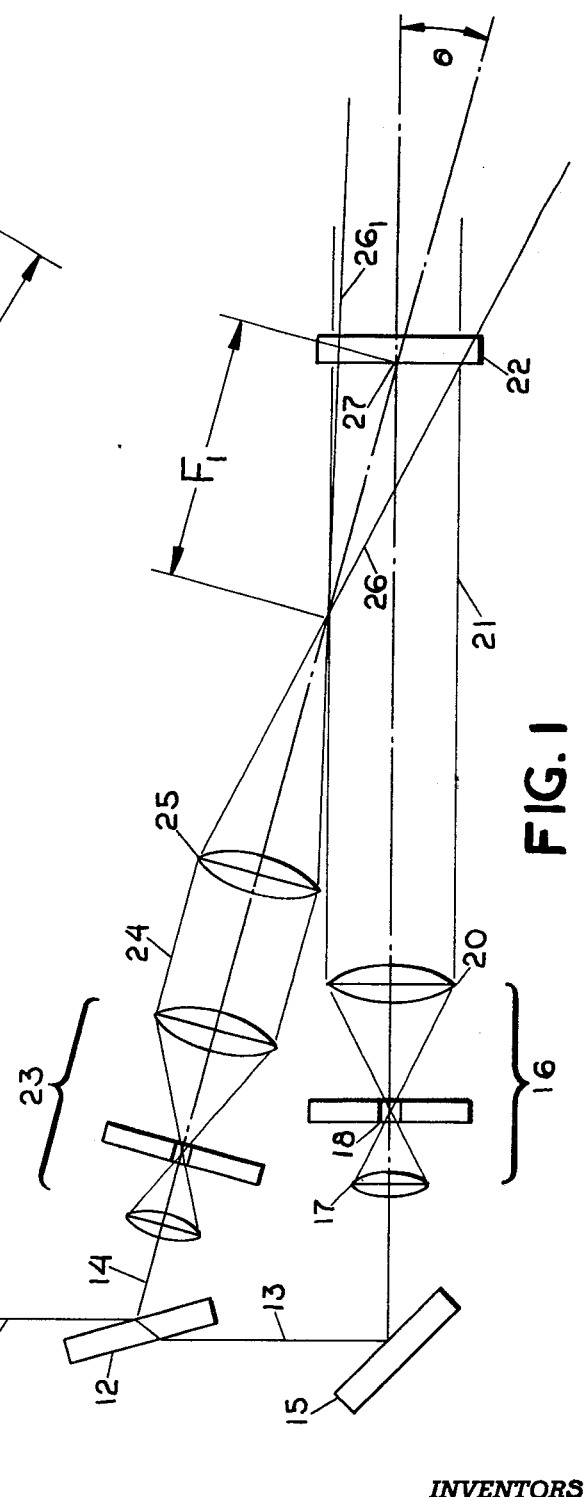

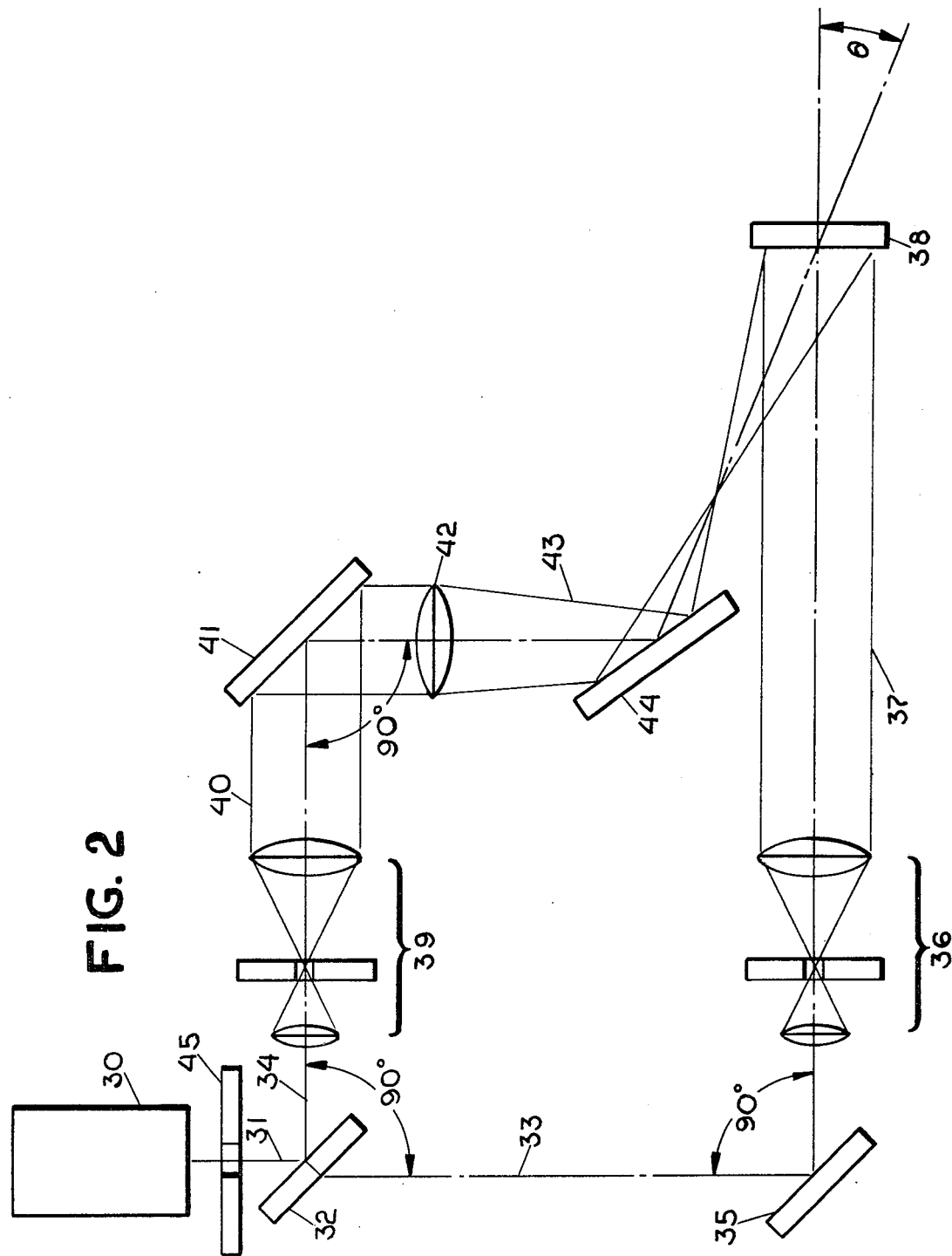

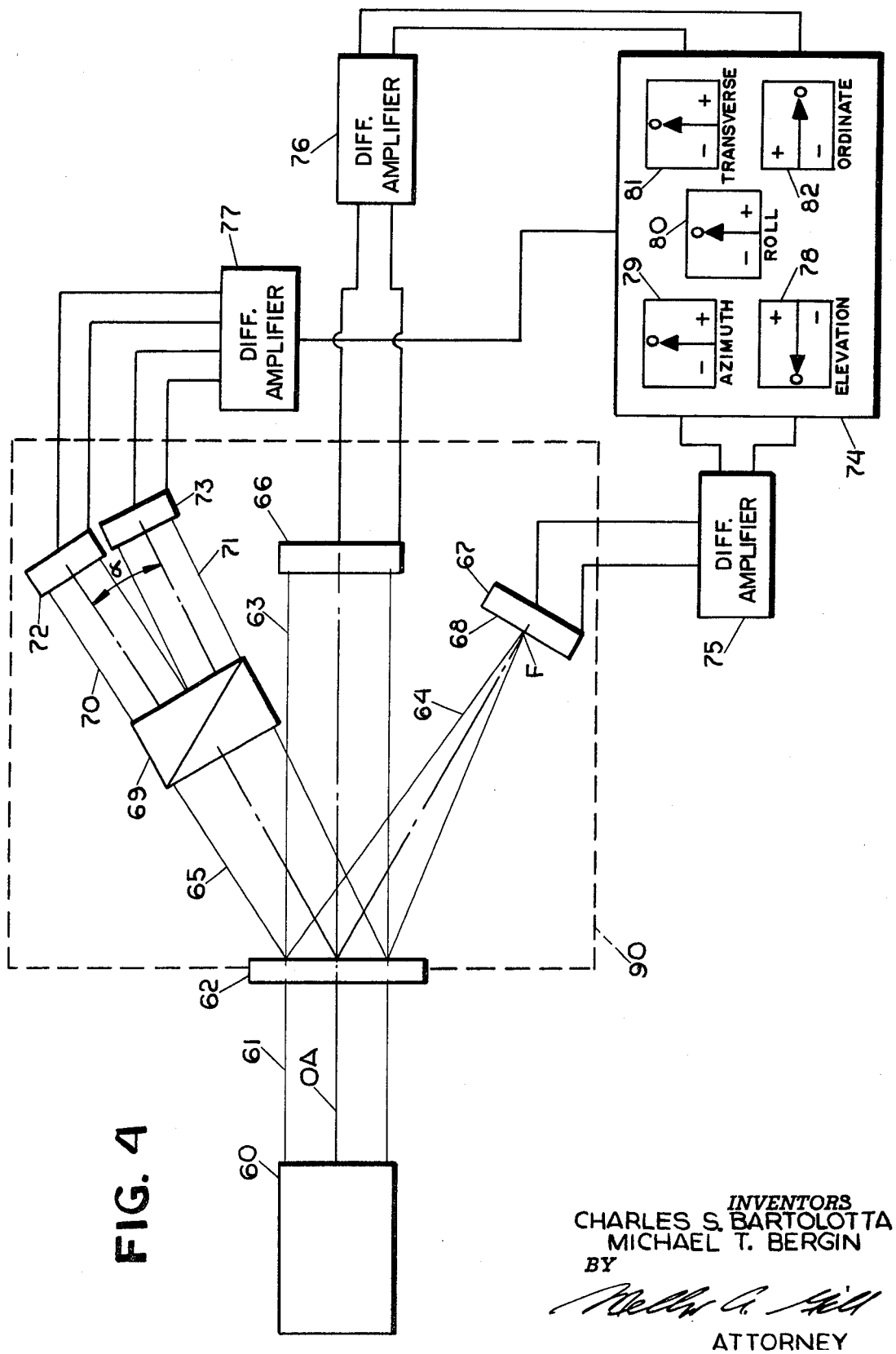

3,701,602
MULTI-AXIS OPTICAL ALIGNMENT SYSTEM INCLUDING A SPATIAL FILTER
Michael T. Bergin, Whitestone, and Charles S. Bartolotta, Nesconset, N.Y., assignors to Grumman Aerospace Corporation, Bethpage, N.Y.
Filed Apr. 30, 1971, Ser. No. 138,892
Int. Cl. G01b 11/27
U.S. Cl. 356—152   11 Claims

ABSTRACT OF THE DISCLOSURE

A multi-axis optical alignment system using a holographic lens. A spatially filtered, collimated beam of light is divided by the holographic lens into three distinct paths; an undiffracted beam, a converging beam, and a diverging beam. The undiffracted beam intercepts a position-sensitive photodetector to monitor linear displacement and the converging beam is focused on a similar detector to monitor angular displacement. The diverging beam is directed through a Wollaston Prism and detector arrangement to monitor displacement about the roll axis. Two methods for making the holographic lens used in the system are disclosed.

FIELD OF THE INVENTION

The invention relates to a multi-axis electro-optical alignment system and, more particularly, to an optical alignment system using a holographic lens and the method of making such lenses.

DESCRIPTION OF THE PRIOR ART

The prior art shows a number of examples of electro-optical systems having the capability of aligning spaced objects or bodies about two and three mutually-perpendicular axes. A characteristic of almost all these prior art systems is the use of precisely ground optical devices such as lenses and prisms which have severe requirements with respect to the alignment of the optical components and their protection from misuse and damage. The prior art also shows the use of holograms to simulate the properties of optical elements such as lenses and prisms. However, there does not appear to have been an appreciation in the prior art of the advantages of using these known holographic lens in an optical alignment system. As is known, the incident beam passing through this type of holographic lens emerges in three beams: an undiffracted zero order beam, a diverging first order beam, and a converging first order beam. In the prior art utilization of holographic lenses, the primary concern was to obtain maximum light intensity in the converging first order beam of the holograph and the associated zero and first order diverging beams were considered redundant, whereas in our invention we make full use not only of the zero order, but also of the first order beams.

SUMMARY OF THE PRESENT INVENTION

Broadly, the present invention contemplates the forming of a virtual three-dimensional, contoured lens by holography and the passing of a beam of monochromatic light through the holograph so formed to obtain an on-axis, zero order input beam and two off-axis, first order output beams. Position-sensitive photodetectors in the path of the on-axis beam and one of the off-axis beams monitor linear and angular displacements respectively. The second off-axis beam is passed through a Wollaston Prism and the two output beams from that prism are monitored by intensity-sensitive photodetectors to provide indications of displacements about the roll axis.

The foregoing and other objects and advantages of the invention will be understood more clearly from the following description when taken in conjunction with the accompanying drawings.

BRIEF DESCRIPTION OF THE DRAWINGS

FIG. 1 is a schematic diagram illustrating means by which a hologram employed in practicing the invention may be produced;

FIG. 2 is a schematic diagram illustrating second means by which a hologram employed in practicing the invention may be produced;

FIG. 3 is a schematic diagram illustrating a reconstruction of the optical characteristics of a hologram produced by the means embodied in FIGS. 1 and 2; and FIG. 4 is a schematic diagram illustrating an embodiment of a multi-axis alignment system of the invention employing a hologram produced by the means embodied in FIGS. 1 and 2.

DESCRIPTION OF THE PREFERRED EMBODIMENTS

Referring to the drawings, FIG. 1 shows a first arrangement of apparatus for producing by means of holography, a lens having characteristics particularly suitable for this invention. The arrangement includes a monochromatic light source 10 which, advantageously, is a laser. Alternately, other types of light sources with suitable filters if required can be employed in place of a laser. However, a laser light source is preferred and, as a matter of convenience also, such source will, therefore, be referred to herein as a laser. Laser 10 is used to produce a beam 11 of light which is directed into a beam-splitter 12. Beam-splitter 12, which can be a partially transparent mirror, divides the incident beam 11 into two beams which will be denoted as a reference beam 13 and an object beam 14. Reference beam 13 is diverted 90 degrees by a front-surface mirror 15 and is then spatially filtered and collimated by an optical train 16. Optical train 16 can be of any suitable type and can comprise a microscope objective lens 17, a circular aperture 18, and a collimating lens 20. The reference beam emerges from the optical train as a beam of light 21 having para-axial rays and is directed at an unexposed photographic film plate 22 which is positioned in a plane normal to beam 21.

Object beam 14 is spatially filtered and collimated by an optical train 23 which has the same optical characteristics as optical train 16. The filtered and collimated beam 24 therefrom is then passed through a lens 25 whose optical characteristics are to be holographically reproduced. Lens 25 is a suitable spherically-corrected convergent-divergent lens which has been corrected for astigmatism. The characteristics enumerated for lens 25 are those preferred for the invention embodied herein. It is recognized, of course, that a lens or other optical element having characteristics other than those set forth can be utilized instead of lens 25 if such other characteristics can be utilized advantageously. Beam 26 carrying the optical characteristics of lens 25 is directed on the unexposed film plate 22. The film plate 22 is located at the intersection 27 of the optic axes of the reference beam 21 and object beam 26. When the photographic film plate is exposed it will thus record the interaction of the spherical wavefront of object beam 26 and the plane wavefront of reference beam 21. As is known, it is the interference pattern of this interaction captured by the film plate which defines a holographic lens. It will be understood that the apparatus of FIG. 1 is set up and aligned prior to the positioning of the unexposed film plate therein and the plate is exposed by means such as by an appropriate shutter 28 or by pulsing laser 10 all in a known manner.

A second arrangement of apparatus for producing a holographic lens particularly useful in the electro-optical alignment system of our invention is shown in FIG. 2. It will be seen that this apparatus is a modification of the known Mach-Zehnder interferometer. In the embodiment of FIG. 2, a suitable light source, preferably a laser 30 produces a beam of light 31 which is directed into a suitable beam-splitter 32. Beam-splitter 32 divides the incident beam into two beams, a reference beam 33 and an object beam 34, oriented 90 degrees with respect to one another. Reference beam 33 is diverted 90 degrees by a front surface mirror 35 and is then spatially filtered and collimated by an optical train 36. Optical train 36 can be of any suitable type and can have the same optical characteristics as optical train 16. The reference beam emerges from the optical train 36 as a beam of light 37 having para-axial rays and is then directed at an unexposed photographic film plate 38 which is positioned in a plane which is normal to beam 37.

Object beam 34 is spatially filtered and collimated by an optical train 39 which can have the same characteristics as optical train 36. The filtered and collimated beam 40 therefrom is diverted 90 degrees by a front surface mirror 41 and is then passed through a lens 42 whose optical characteristics are to be holographically reproduced. Lens 42 can be of any suitable type having the optical properties required: in this alignment system we prefer to use a spherically-corrected convergent-divergent lens which has been corrected for astigmatism. Beam 43 carrying the optical characteristics of lens 42 is diverted by a front surface mirror 44 and is directed on the unexposed film plate 38. It will be appreciated that mirror 44 is located such that it does not interfere with reference beam 37 and the mirror is positioned also to produce the desired angular offset $\theta$ between the two beams 37 and 43. As in the embodiment of FIG. 1, the film plate 38 is placed at the point of maximum interaction of the diverging object beam 43 and the collimated reference beam 37. As in that embodiment also, the apparatus is set up and aligned prior to the positioning of the unexposed film plate 38 therein. Plate 38 is exposed by means such as by an appropriate shutter 45 or by pulsing laser 30 all in a known manner.

It will be understood that other suitable methods for constructing a holographic lens can be employed and, although the means embodied in FIGS. 1 and 2 are preferred, any other appropriate method can be utilized. A holographic lens is a recording of the interference pattern generated by the interaction of plane and spherical wavefronts and, as is well known, a circular aperture can be used instead of lenses 25 or 42 to generate the spherical wavefront in the pattern. In using a "pinhole" technique to produce the lens characteristics, the optical train 23 and lens 25 of the embodiment of FIG. 1 (optical train 39 and lens 42 in FIG. 2) are replaced by a microscopic objective lens and a circular aperture (not shown) in the path of the objective beams 24 and 40, respectively. The resulting holographic lens generated by either the circular aperture or the ground lens will have the same basic optical characteristics.

The holographic lens produced by the aforementioned techniques will, when illuminated by a beam of collimated light, produce three output beams. These beams, as will be discussed below in greater detail, are a zero-order beam, a diverging first-order beam, and a converging first-order beam. In the prior art, the primary concern is to obtain maximum light intensity in one of the beams, generally the converging first-order beam, and the extinction of the remaining two beams. On the other hand, to achieve the maximum capabilities of the alignment system of our invention, full use is made by use of all three output beams. As is known, the light intensities of all three of the holographic lens output beams are equal with the sum total approximately equal to the light intensity of the incident input beam. In our invention, in order to increase the intensities of the beams, particularly the first-order beams, the photographic film plate on which the interference pattern is recorded is overexposed (within obvious limitations) during the construction phase of the holographic lens. Overexposure permits deeper penetration of the interference pattern into the photographic emulsion as well as recording more of the higher frequency information. We have also found it helpful to alter the conventional process while developing the plate by introducing a chemical bleaching interval and thereby reduce the darkness of the silver halide grains in the photographic emulsion. Any suitable chemical bleach known in the art may be utilized for the purpose or an appropriate reducing agent may be added to the developing solution. Overexposure and bleaching of the photographic plate increases the efficiency of a holographic lens in our alignment system by permitting more light to pass through the lens and thereby increase the intensity of the output beams, but, although such techniques may be employed in the interest of efficiency, it is not essential in the practice of our invention.

After the photographic plate produced by the aforementioned techniques is developed, reconstruction of the lens characteristics recorded thereon is demonstrated according to the diagram of FIG. 3. Light from a laser 50 is spatially filtered and collimated by an optical train 51 to produce a beam of collimated light 52. Optical train 51 can be of any suitable type as discussed previously. A developed holographic film plate 53 produced in accordance with the techniques described previously is placed in the collimated beam 52 at normal incidence thereto. Collimated beam 52 is divided by the holographic interference pattern recorded in the plate 53 into three separate beams; an undiffracted zero-order beam 54, a converging first-order beam 55, and a diverging first-order beam 56. Zero-order beam 54 is the undiffracted portion of collimated beam 52 and retains all its optical characteristics. First-order beam 55, if the plate 53 was produced using the apparatus disclosed in FIG. 1, will be a mirror image of beam 26 carrying the characteristics of lens 25 and will be a true reproduction of the wavefront generated by that lens. Thus, the angular offset $\theta$ of the beam 55 in FIG. 3 is the same as the angular offset $\theta$ of beam 26 in FIG. 1. Likewise, the focal length $F_2$ of beam 55 is the same as the distance $F_1$ of beam 26. The second first-order beam 56 also has the same angular offset $\theta$ as beam 26 of FIG. 1 (if, again, the assumption is made that holographic film plate 53 was produced using the apparatus disclosed therein) and can be considered to be a reproduction of the extension $26_1$ of beam 26, the extension being the path the beam would travel if not intercepted by the photographic plate 22.

The angular offset $\theta$ used in the production of the holographic lens functions to produce the offset first-order beams utilized advantageously in the alignment system of this invention. From a practical standpoint, it is important that the angle of offset be sufficient to prevent interference of, for example, the lens 25 with reference beam 21 (see FIG. 1) or mirror 44 with reference beam 37 (see FIG. 2). When that practical consideration is satisfied, the angular offset can be varied as required within obvious limits to produce the optical characteristics required.

FIG. 4 illustrates electro-optical apparatus utilizing the holographic lens constructed in accordance with the embodiments of FIGS. 1 and 2 providing multi-axis alignment monitoring of space bodies. In this alignment system an appropriate laser 60 projects a beam of collimated light 61 through a holographic lens 62 which was constructed as described above. Lens 62 divides beam 61 into three beams; beam 63 which is a continuation of the incident beam 61; a converging beam 64; and a diverging beam 65. These beams will have the optical characteristics discussed in the description given above of the holographic lenses. A suitable position-sensitive photo detector 66 is positioned in the path of beam 63 and a similar photodetector 67 is positioned at the focal point F of beam 64. Although any suitable type of protodetector 66 and 67 may be used, we prefer to use a photodiode for the purpose, such as the type, by way of example only, which utilizes the Schottky-Barrier effect. As is known, these photodiodes have high continuous position-sensitivity, fast response and excellent linearity, and thus are preferred for measuring linear and angular displacement in the alignment system of our invention. Photodetector 66 in the path of beam 63 monitors the linear displacement of that beam in both transverse and ordinate axes. Since beam 63 is a continuation of beam 61, the sensing of the linear displacement of beam 63 is essentially a sensing of the linear displacement of incident beam 61. Photodetector 67 is positioned at the focal point F of converging beam 64. Since holographic lens 62 is a true reproduction of geometric lens 25 or 42 used to produce that holographic lens, it will have all the optical characteristics of such geometric lenses. Thus, the focal point of lens 62 will not move if beam 61 is displaced linearly in any direction but any angular displacement of beam 61 either in azimuth or elevation will produce an associated movement of focal point F along the surface 68 of photodetector 67. Position-sensitive photodetectors 66 and 67 are fabricated in any suitable, known manner with a null spot in the center of the detector face. Linear displacement of the spot of light incident on the detector face relative to the center thereof results in the generation of an analog electrical output signal which is directly proportional to the distance in rectilinear coordinates of the light spot from the detector center. Diverging beam 65 is utilized to monitor the roll angle displacement of incident beam 61. The light beam 61 emitted by laser 60 is characteristically plane-poolarized and consequently beam 65 has the same polarization state. Polarized beam 65 is passed through a Wollaston Prism 69 or other suitable polarization device to divide it into two separate beams, an ordinary beam 70 and an extraordinary beam 71. The two beams are angularly separated by an amount which is predetermined in the construction of the Wollaston Prism and the light intensities of the beams are a function of the orientation of the plane of polarization of beam 61. Rotation of beam 61 results in a rotation of the plane of polarization which, in turn, causes an increase in the light intensity of one beam by an amount equal to the decrease in intensity of the second beam. Roll angle readout is accomplished by placing an intensity-sensitive, photodetector 72 and 73 in each of beams 70 and 71, respectively. The difference between the current outputs of the two photodectors is in direct proportion to the amount that the incident beam 61 has been rotated.

The electrical output from the photodetectors 66, 67, 72, and 73 is carried to the readout console 74 by suitable interconnecting cabling after being suitably amplified by appropriate differential amplifier systems 75, 76, and 77. Any suitable amplifier system can be utilized such as the solid-state types having low-drain characteristics. As is known, the components in the circuitry are chosen to minimize the D.C. drift and to provide the capacity to "zero-out" D.C. offsets. The outputs from the amplifiers are fed to suitable display means such as zero-center current meters 78–82 in console 74 or suitable digital readout meters. As shown, the displacement readout display can take the form of five separate meters or a single meter having a suitable switching arrangement to select the desired readout can be employed.

In practicing the teachings of our invention, it will be assumed that the system has been calibrated such that lens 62, Wollaston Prism 69, and the photodetectors 66, 67, 72, and 73, which together comprise the electrooptical components of the sensing head 90 of our aligment system, are aligned so as to produce zero or null indications on the current meters 78–82 in console 74.

In the normal alignment system set-up, sensing head 90 will be mounted on the body or equipment (not shown) whose positional orientation is being monitored and the laser 60 will be mounted on a reference body or surface (not shown). That surface can be the floor of the building containing the equipment being monitored and the display console 74 can also be positioned on the same surface in a convenient location. It will be appreciated, of course, that an alternate "set-up" in which the laser 60 is mounted on the equipment being monitored and the sensing head 90 is positioned on the reference surface can also be utilized if desired.

In operation, light from laser 60 incident on lens 62, as discussed previously, is divided into three beams 63, 64, and 65. When laser 60 is precisely aligned with the sensing head 90, the three beams will be aligned with respect to their respective photodectors such that a zero indication is produced on the meters of the display console 74. If a relative movement between the laser and the sensing head should cause incident beam 61 to be displaced, for example, laterally, a related linear displacement of beam 63 with respect to photodetector 66 will result. Any displacement of the incident light beam relative to the center or null point of the photosensitive face of the photodetector will result in the generation of an electrical output signal therefrom. This output signal will be in an analog form and will be directly proportional to the distance in rectilinear coordinates of the incident light beam from the null point of the photodector. As is known, photodetectors of this type are constructed with two orthogonal axes. If the displacement of the incident beam has solely a transverse component, there will thus be an analog signal from the transverse axis of the photodetector and a null signal from the ordinate axis. After suitable amplification, the analog signal is diplayed on current meter 81. The null signal will, of course, produce a zero indication on current meter 82.

Lens 62 duplicates the characteristics of the spherically-corrected lens used to produce it. Thus, when the incident beam 61 enters lens 62 parallel to the optic axis OA of the lens, converging beam 64 from the lens will be focused to a spot F at the center of photodetector 67, giving a null reading on the current meters 78 and 79, representative of the elevational and azimuthal displacements respectively. By the nature of spherically-corrected lenses, beam 64 will remain focused at point F during any lateral displacement of incident beam 61, providing beam 61 remains parallel during that displacement to the optic axis OA of lens 62. The lateral displacement of the incident beam that produced the analog signal displayed on current meter 81 indicating a transverse displacement will not, therefore, produce any indication of any elevational or azimuthal movement on meters 78 and 79 as long as beam 61 remains parallel to optic axis OA such that beam 64 remains focused at F during that transverse displacement. However, if incident beam 61 becomes displaced at some angle $\phi$ to the optic axis OA of lens 62, the focal point of beam 64 is displaced from the optical center of photodetector 67 by a distance $x=y \tan \phi$, where $y$ is the focal length of the lens. Since for small angles, $\tan \phi = \phi$ and $y$ is a constant, the displacement of the focused spot on the photodetector is directly proportional to the angular displacement of beam 61 with respect to the axis OA of lens 62. Photodetector 67, like photodetector 66 is constructed with two orthogonal axis. Thus, if the angular displacement of beam 61 is in elevation, there will be an analog signal from the elevational axis of the photodetector and a null signal from the azimutal axis. This output from the photodetector is suitably amplified in differential amplifier system 75 and the analog signal is displayed on current meter 78. The null signal will, as set forth previously, result in a zero indication on current meter 79.

Orientation of incident beam 61 with respect to rotation or roll about optical axis OA is monitored by divergent beam 65. As described previously, beam 65 is linearly polarized. Thus, when beam 65 is passed through Wollaston Prism 69, it is divided into an ordinary beam 70 and an extraordinary beam 71 which are separated by some angle $\alpha$. When incident beam 61 is oriented with respect to the sensing head 90 without relative rotation about optic axis OA, the output beams 70 and 71 from the Wollaston Prism 69 are equal in intensity, giving equal outputs from the intensity-sensitive photodetectors 72 and 73. With equal outputs, therefore, after processing through the differential amplifier system 77, a null or zero presentation is displayed on the zero center current meter 80. When there is relative rotation betwen laser 60 and sensing head 90, this will produce a rotation of the plane of polarization of incident beam 61 about the optic axis OA. This rotation will, of course, produce a rotation of the same angular displacement of beam 65 incident on prism 69. As is known, rotation of the plane of polarization of polarized light incident on Wollaston Prism 69 will vary the relative intensities of the ordinary beam 70 and extraordinary beam 71 componets of incident beam 65, with the difference in intensities between the two being in direct proportion to the amount that beam 61 has rotated. The current outputs from photodetectors 72 and 73 vary proportionally by the same factor and, when amplified by differential amplifier system 77, will give a roll angle measurement when displayed on current meter 80.

In the alignment system of our invention as embodied in the apparatus of FIG. 4, monitoring of alignment in all five axes of measurement is accomplished. Should that capability be in excess of requirements, the apparatus can be modified accordingly to monitor a lesser number of axes. Inasmuch as such modification is of an obvious nature, it is not believed that a useful function will be served by a description thereof. It is also well known in the art to compensate for the effects of ambient light, variations in light intensity in the light source 60, and for fluctuations of the polarization plane, if a laser is used for that source, that serves to degrade the measurement accuracy of the system. Any suitable known means can be utilized to reduce these effects. For example, we have found the combination of an optical filter placed immediately in front of the photodetectors and amplitude modulation of the laser beam in conjunction with appropriate electronic filtering in the readout meter circuitry in readout console 74 to be effective in eliminating the effects of ambient light. An electronic automatic gain control system located in the readout unit can be used to compensate for intensity variations in the laser output power. As is also known, fluctuations of the polarization plane of the laser can be minimized with the installation of a Glan-Thompson Prism in the collimated output beam of the laser. The Glan-Thompson Prism will insure stability of the polarization plane to better than one part in $10^6$. When properly set-up and calibrated, our alignment system has the capability of measuring displacement as small as one arc second in the three angular axes and $1 \times 10^{-4}$ inches in the two linear axes. As discussed previously, a laser is the preferred light source; however, any suitable monochromatic light source can be utilized in the alignment system of our invention without significant degradation in the resolution of the system. It will be appreciated, of course, that the output beam from the light source must be collimated, plane-polarized light. If the light does not have the proper characteristics, they may be obtained through the employment of appropriate optical means, all in a known manner.

Although shown and described in what is believed to be the most practical and preferred embodiments, it is apparent that departures from the specific constructions shown will suggest themselves to those skilled in the art and may be made without departing from the spirit and scope of the invention. We, therefore, do not wish to restrict ourselves to the particular constructions illustrated and described, but desire to avail ourselves of all modifications that may fall within the scope of the appended claims.

Having thus described our invention, what we claim is:

1. The method of determining the positional orientation of one object relative to another comprising:

transmitting coherent electromagnetic radiation from an energy emitter and dividing said radiation into two beams, the first of which impinges directly on a receiver adapted to record the radiation, and the second of which impinges on said receiver after being refracted by refraction means imparting thereto a circular wave front;

developing a photographic record of the interference patterns between the direct radiation and the refracted radiation;

positioning the resultant hologram on said one object and a source of plane-polarized coherent radiation on said other object;

illuminating said hologram on said one object with a beam from said source of plane-polarized coherent radiation on said other object whereby said source beam passing through said hologram reconstructs the wave fronts of the original refracted radiation recorded thereon and thereby produces a zero-order beam and first and second first-order beams having all the optical characteristics of said source beam;

positioning a first position-sensitive detector on the optic axis of said zero-order beam;

positioning a second position-sensitive detector on the optic axis of said first first-order beam at the focal point thereof;

passing said second first-order beam through polarization-sensitive means to thereby produce first and second output beams whose intensities are proportional to the orientation of the plane of polarization of said source beam relative to the optic axis of said polarization-sensitive means;

positioning first and second intensity-sensitive detectors on the optic axis respectively of said first and second output beams from said polarization-sensitive means;

passing to current-measuring means the electrical output developed by said first position-sensitive detector in response to lateral displacements of said zero-order beam resulting from like displacements of said source beam whereby said lateral displacements of said source beam produce in said measuring means an indication representative of the amount of said lateral displacements;

passing to current measuring means the electrical output developed by said second position-sensitive detector in response to angular displacements of said first first-order beam resulting from like displacements of said source beam whereby said angular displacements of said source beam produce in said measuring means an indication representative of the amount of said angular displacements; and passing to current measuring means the electrical output developed by said first and second intensity-sensitive detectors in response to rotational displacements of said second first-order beam resulting from like displacements of said source beam whereby said rotational displacements of said source beam produce in said measuring means an indication representative of the amount of said rotational displacements.

2. The method of claim 1 wherein the electromagnetic radiation is in the optical range and said receiver is a photographic plate.

3. The method of claim 1 wherein the holographic record is over-exposed and bleached during its development to thereby increase its radiation transmission qualities.

4. The method of claim 1 wherein the position-sensitive detectors each have a null area and wherein the optical axis of the incident beam passes through said null area whereby displacement of said incident beam moves it off said null area on to a sensitive area to thereby produce an output voltage representative of said beam displacement.

5. The method of claim 1 wherein the plane-polarized radiation is in the optical range and the detectors associated therewith are photodetectors.

6. The method of claim 1 wherein the polariation-sensitive means is a birefringent prism.

7. The method of claim 1 wherein the polarization-sensitive means is a Wollaston Prism.

8. The method of claim 1 wherein the refraction means is a spherically-corrected lens.

9. Alignment apparatus in which the positional orientation of one object is monitored with respect to another object comprising:
  a source of plane-polarized coherent radiation mounted on one of said objects;
  alignment-monitoring means mounted on the other of said objects in an operative relationship with radiation from said source, said monitoring means further comprising;
  diffraction means in the path of said radiation from said source for diffracting said radiation such that at least one zero-order beam and more than one first-order beams are produced, at least one of said first-order beams being convergent and having a focal point, the axes of said first-order beams being angularly displaced from the axis of said zero-order beam;
  polarization-sensitive means in the path of one of said first-order beams for dividing that beam into a primary and a secondary beam whose intensities are a function of the orientation of the plane of polarization of said source radiation relative to the optic axis of said polarization-sensitive means whereby relative rotation of the source of the radiation with respect to the monitoring means mounting said polarization-sensitive means produces a proportional change in intensity of said primary beam relative to said secondary beam;
  intensity-sensitive detecting means in the paths of said primary and secondary beams for producing as a function of the changes in relative intensity between the beams a signal output representative of the rotational displacement of said monitoring means relative to said radiation source;
  position sensitive detecting means in the path of said zero-order beam for producing as a function of the lateral displacement of the beam a signal output representative of the later displacement of said monitoring means relative to said radiation source; and
  position-sensitive detecting means at the focal point of said convergent first-order beam for producing as a function of the angular displacement of said source beam a signal output representative of the angular displacement of said monitoring means relative to said radiation source.

10. The alignment apparatus of claim 9 wherein the diffraction means is a holographic lens reconstructing the optical characteristics of a spherically corrected lens.

11. The alignment apparatus of claim 9 wherein the coherent radiation is in the optical range and the detectors associated therewith are photodetectors.

References Cited
UNITED STATES PATENTS 3,486,826  12/1969  Colvin et al. _____ 356—150

RONALD L. WIBERT, Primary Examiner

O. B. CHEW II, Assistant Examiner

U.S. Cl. X.R.

356—172